UNITED STATES PATENT OFFICE.

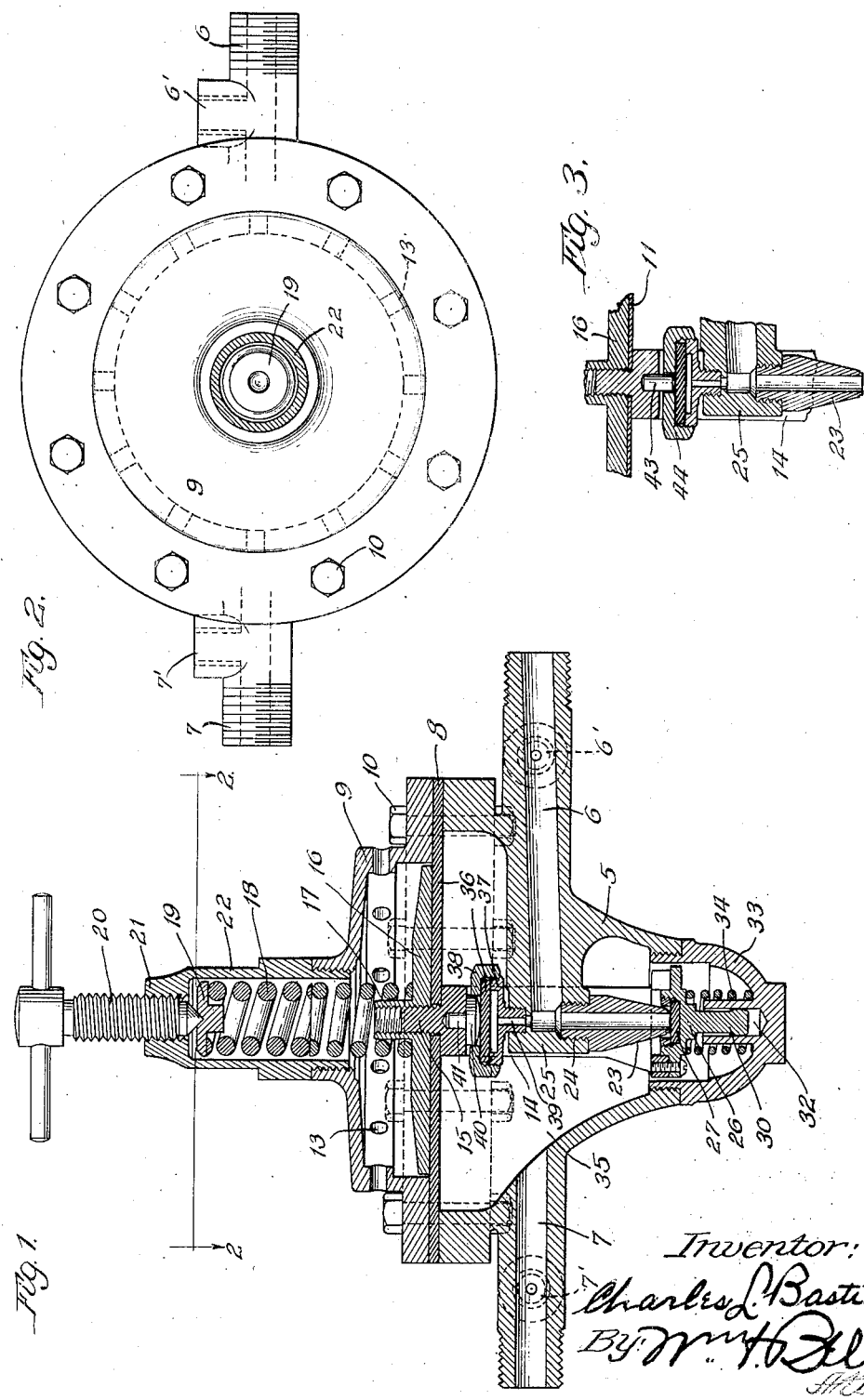
C. L. BASTIAN.
FLUID PRESSURE REGULATING VALVE.
APPLICATION FILED MAY 13, 1921.
1,408,923.
Patented Mar. 7, 1922.
Inventor:
Charles L. Bastian

CHARLES L. BASTIAN, OF CHICAGO, ILLINOIS.

FLUID-PRESSURE-REGULATING VALVE.

1,408,923.   Specification of Letters Patent.   Patented Mar. 7, 1922.

Application filed May 13, 1921. Serial No. 469,339.

*To all whom it may concern:*

Be it known that I, CHARLES L. BASTIAN, a citizen of the United States, residing at Chicago, in the county of Cook and State of Illinois, have invented certain new and useful Improvements in Fluid-Pressure-Regulating Valves, of which the following is a specification.

This invention relates to improvements in fluid pressure regulating valves which are used for many purposes, including the regulation and delivery of gases to oxy-acetylene welding and cutting apparatus at desired pressures.

My invention has for its object generally to provide a pressure regulating valve of improved construction which makes it more substantial in service, more efficient in operation and more accurate in results than has heretofore been customary in such valves.

One difficulty with existing valves is the necessity for readjusting the regulating spring from time to time as the pressure supply reduces in order to maintain delivery of at least approximately the required volume of gas. Since such readjustment requires manual manipulation it is at best performed irregularly and spasmodically, and consequently an even flow of uniform volume of gas is only obtained where especial care is exercised.

A very important object of the invention is to automatically maintain the delivery of a predetermined volume of gas regardless of the fact that the pressure supply is constantly decreasing; and, more specifically, my object is to utilize the pressure supply to automatically control the pressure sensitive means and enlarge the opening between the nozzle and the disk in proportion to the decrease of pressure supply to constantly maintain an even delivery of gas in a uniform volume.

In the drawings I have illustrated a selected embodiment of the invention and referring thereto Fig. 1 is a vertical section through a fluid pressure regulating valve of the low pressure type and embodying the invention;

Fig. 2 is a plan view partly in section on the line 2—2 of Fig. 1;

Fig. 3 is a detail sectional view showing the invention embodied in another form in a fluid pressure regulating valve of the high pressure type.

Referring to the drawings, the valve casing comprises a body 5 provided with a gas inlet 6 and an outlet 7 through which the gas may be delivered to the work. Pressure gauges may be connected to the inlet at 6' and to the outlet at 7'. In Fig. 1 a rubber diaphragm 8 is clamped between the body 5 and the bonnet 9 by bolts 10. In Fig. 3 I have shown a metal diaphragm 11 which may be secured in the valve as shown in my co-pending application Serial No. 383,645, filed May 24, 1920. The bonnet 9 is preferably provided with openings 13 to permit instant escape of pressure without blowing off the bonnet in the event the diaphragm is broken. A yoke 14 has a threaded stem 15 passing through a central opening in the diaphragm and engaging the thread of a flanged collar 16, which latter is provided with a nipple 17 forming a guide for a regulating spring 18 carrying at its upper end a button 19 that receives the thrust of an adjusting screw 20 threaded in the end 21 of a tubular extension 22 of the bonnet. An inlet nozzle 23 is threaded in a socket 24 in a bridge 25 and connects with the inlet passage 6. The yoke 14 straddles the nozzle and carries a support 26 having a valve disk 28. Depending from the support 26 is a guide 30 which operates in a socket 32 in the cap 33. A balance spring 34 interposed between the support 26 and the cap 33 tends to hold the valve disk 28 against the end of the nozzle 23.

The inlet nozzle and valve disk are preferably constructed as set forth in my co-pending application Serial No. 272,421, filed January 22, 1919, but the present invention may be embodied in valves having nozzles and disks constructed otherwise, if desired.

It is customary to turn the screw 20 to adjust the tension of the spring 18 so that the desired pressure as shown by the gauge will be delivered to the work. The tension of the regulating spring 18 overcomes the tension of the balance spring 34 and operates the diaphragm 8 to carry the disk 28 away from the nozzle 23 sufficiently to admit pressure to the chamber 35 at the predetermined pressure to be delivered. Since the screw adjustment is made with relation to the initial pressure supply it is apparent that, as the pressure supply decreases, the screw must be readjusted if the disk and nozzle are to be kept in operative relation necessary to maintain uniformity in delivery volume. Heretofore it has been customary to manually adjust the screw from time to time while the valve was in use, in an effort to proportion the tension of the springs to the pressure supply as the supply diminishes and thereby secure as nearly as possible a uniform volume at the nozzle inlet to the valve chamber 35. My invention takes care of this automatically by utilizing the pressure supply to control the spring tension after the initial setting, so that it is automatically adjusted in proportion to the variation in pressure supply as the supply decreases.

In the drawings I have shown this feature of my invention embodied in a simple and efficient means comprising a diaphragm 36 secured to the upper end of a short cylinder 37 by a flange ring 38 and receiving the pressure supply through a passage 39 connecting the cylinder 37 with the inlet 6. In Fig. 1, a plunger 40 is guided in the yoke 14 and its head is arranged to be pressed by the diaphragm against the yoke with a pressure corresponding to the supply pressure so that the action of the adjusting spring will be modified accordingly. When the supply pressure is high, the diaphragm 36 will resist the adjusting spring strongly and support the valve disk close to the nozzle, but as the supply pressure diminishes the resistance of the diaphragm will correspondingly dimish and permit the valve disk to be forced away from the nozzle sufficient to compensate for the reduced pressure. The diaphragm 36 forms an efficient packing which prevents the escape of pressure into the valve chamber 35.

In Fig. 1 I have shown the plunger as having a spherical head 40 and a stem 41 at the top guided in a socket 42 in the yoke, but I do not wish to be limited in this respect for the structure may be greatly varied without departing from the invention. A suitable modification for certain work is shown in Fig. 3, where this plunger is replaced by a straight stem 43, extending through a cap 44 and with its ends directly engaging the diaphragm and the yoke respectively.

Other changes in the details of construction and arrangement of parts may be made without departing from the spirit or sacrificing the advantages of the invention and I reserve the right to make all such changes as fairly fall within the scope of the appended claims.

I claim:

1. In a pressure regulating valve, the combination of a casing providing a chamber having an inlet and an outlet, pressure sensitive means for controlling the inlet to said chamber, primary regulating means adapted to adjust said pressure sensitive means to admit a desired volume of fluid at the initial pressure of the supply, and auxiliary regulating means acting upon said pressure sensitive means to maintain a constant inlet volume as the pressure supply decreases.

2. In a pressure regulating valve, the combination of a casing providing a chamber having an inlet and an outlet, pressure sensitive means for controlling the inlet to said chamber, primary regulating means adapted to adjust said pressure sensitive means to admit a desired volume of fluid at the initial pressure of the supply, and auxiliary regulating means dependent upon the inlet pressure and acting on said pressure sensitive means to maintain a constant inlet volume as the pressure supply decreases.

3. In a pressure regulating valve, the combination of a casing providing a chamber having an inlet and an oulet, pressure sensitive means for controlling the inlet to said chamber, primary regulating means adapted to adjust the pressure sensitive means to admit a desired volume of fluid at the initial pressure of the supply, and yielding auxiliary regulating means dependent upon the inlet pressure and acting on said pressure sensitive means for automatically modifying the adjustment of said primary regulating means to maintain a constant inlet volume as the pressure supply decreases.

4. In a pressure regulating valve, the combination of a casing providing a chamber having an inlet and an outlet, pressure sensitive means for controlling the inlet to said chamber, primary regulating means adapted to adjust the pressure sensitive means to admit a desired volume of fluid at the initial pressure of the supply, and auxiliary regulating means dependent upon the inlet pressure and acting on and in opposition to the pressure sensitive means for automatically relieving said pressure sensitive means proportionately to the decrease of pressure supply to permit said pressure sensitive means to maintain a constant inlet volume as the pressure supply decreases.

5. In a pressure regulating valve, the combination of a casing providing a chamber having an inlet and an outlet, pressure sensitive means for controlling the inlet to said chamber, primary regulating means adapted to adjust the pressure sensitive means to admit a desired volume of fluid at the initial pressure of the supply, and auxiliary regulating means opposed to said primary regulating means and operated by the pressure supply and acting on said pressure sensitive means for automatically relieving said pressure sensitive means proportionately to the decrease of pressure supply to permit said pressure sensitive means to maintain a constant inlet volume as the pressure supply decreases.

6. In a pressure regulating valve, the combination of a casing providing a chamber having an inlet and an outlet, pressure sensitive means for controlling the inlet to said chamber and comprising a valve disk normally engaging said inlet, primary regulating means adapted to adjust said pressure sensitive means to move valve disk sufficiently to admit a desired volume of fluid at the initial pressure of the supply, and auxiliary regulating means for automatically increasing the extent of movement of said disk relative to the inlet as the pressure supply decreases to maintain the inlet volume constant.

7. In a pressure regulating valve, the combination of a casing providing a chamber having an inlet and an outlet, pressure sensitive means for controlling the inlet to said chamber and comprising a valve disk normally engaging said inlet, primary regulating means adapted to adjust said pressure sensitive means to space said valve disk from said inlet a sufficient distance to admit a desired volume of fluid at the initial pressure of the supply, and flexible auxiliary adjusting means operated by the said pressure supply for automatically increasing the spacing of said disk relative to the inlet as the pressure supply decreases to maintain the inlet volume constant.

8. In a pressure regulating valve, the combination of a casing providing a chamber having an inlet and an outlet, pressure sensitive means for controlling the inlet to said chamber, primary regulating means adapted to adjust said pressure sensitive means to admit a constant volume of fluid at the initial pressure of the supply, and a diaphragmatic member operated by the pressure supply and operating on the pressure sensitive means in opposition to the primary regulating means for automatically modifying the action of said pressure sensitive means to maintain a constant inlet volume as the pressure supply decreases.

9. In a pressure regulating valve, the combination of a casing providing a chamber having an inlet and an outlet, pressure sensitve means for controlling the inlet to said chamber, primary regulating means adapted to adjust the pressure sensitive means to admit a constant volume of fluid at the initial pressure of the supply, and a diaphragm within the chamber and operated by the pressure supply for automatically controlling said pressure sensitive means to maintain a constant inlet volume as the pressure supply decreases.

10. In a pressure regulating valve the combination of a casing providing a chamber having an inlet and an outlet, pressure sensitive means for controlling the inlet to said chamber and including a valve disk adapted to be moved away from the inlet to permit entrance of pressure to the chamber, primary regulating means adapted to adjust said pressure sensitive means to separate said valve disk from said inlet a sufficient distance to admit a desired volume of fluid at the initial pressure of the supply, and a diaphragm operated by the pressure supply to automatically increase the distance between the valve disk and the inlet as the pressure supply decreases to maintain the inlet volume constant.

11. In a pressure regulating valve, the combination of a casing providing a chamber having an inlet and an outlet, a nozzle connected to said inlet, a valve disk to engage said nozzle, pressure sensitive means to control the movement of said valve disk relative to said nozzle, primary regulating means adapted to move said valve disk from said nozzle a sufficient distance to admit a desired volume of fluid at the initial pressure of the supply, and a diaphragm operatively engaging said pressure sensitive means and adapted to be operated by the pressure supply for automatically enlarging the inlet as the pressure supply decreases to maintain a constant inlet volume.

12. In a pressure regulating valve, the combination of a casing providing a chamber having an inlet and an outlet, a nozzle connected to said inlet, a valve disk to engage said nozzle, pressure sensitive means to control the movement of said valve disk relative to said nozzle, primary regulating means adapted to space said nozzle from said inlet a sufficient distance to admit a desired volume of fluid at the initial pressure of the supply, and a diaphragm operatively engaging the pressure sensitive means at one side and being acted upon by the supply pressure at the other side, whereby said valve disk and nozzle are further separated as the supply pressure decreases.

13. In a pressure regulating valve, the combination of a casing providing a chamber having an inlet and an outlet, a nozzle connected to said inlet, a valve disk to engage said nozzle, pressure sensitive means to control the movement of said valve disk relative to said nozzle, primary regulating means adapted to space said nozzle from said inlet a sufficient distance to admit a desired volume of fluid at the initial pressure of the supply, and a supplemental chamber in communication with the supply pressure and having a diaphragm in one wall thereof operatively engaged with the pressure sensitive means, whereby the said valve disk and nozzle are further separated as the supply pressure decreases.

14. In a pressure regulating valve, the combination of a casing providing a chamber having an inlet and an outlet, pressure sensitive means for controlling the inlet to said chamber, and means for automatically controlling said pressure sensitive means to maintain a constant inlet volume as the pressure supply decreases comprising a cylinder in open communication with the pressure supply, a diaphragm in the cylinder and a plunger interposed between the diaphragm and said pressure sensitive means.

15. In a pressure regulating valve, the combination of a casing providing a chamber having an inlet and an outlet, a nozzle connected to said inlet, a valve disk to engage said nozzle, pressure sensitive means to control the movement of said valve disk relative to said nozzle, and means connected to said nozzle and operatively engaging said pressure sensitive means and adapted to be operated by the pressure supply for automatically enlarging the inlet as the pressure supply decreases to maintain a constant inlet volume.

16. In a pressure regulating valve, the combination of a casing providing a chamber having an inlet and an outlet, a nozzle connected with said inlet, a yoke movable relative to said nozzle and carrying a valve disk adapted to close said nozzle, pressure sensitive means to control the position of said valve disk relative to said nozzle, a plunger operatively engaging said yoke and adapted to be acted upon by the pressure supply to modify the action of the pressure sensitive means corresponding to changes in the pressure supply, and a diaphragm serving to prevent the escape of pressure while communicating the force of the supply pressure to said plunger.

17. A pressure regulating valve comprising a casing having a chamber provided with an inlet and an outlet, a valve for the inlet, elastically yieldable means tending to open the valve, pressure actuated means subject to outlet pressure and tending to close the valve, and other pressure actuated means subject to inlet pressure and acting upon the first mentioned pressure actuated means to modify the action thereof.

18. A pressure regulating valve comprising a casing having a chamber provided with an inlet and an outlet, a valve for the inlet, elastically yieldable means tending to open the valve, pressure actuated means including a diaphragm subject to outlet pressure and tending to close the valve, and other pressure actuated means including a diaphragm subject to inlet pressure and acting upon the first mentioned pressure actuated means to modify the action thereof.

19. A pressure regulating valve comprising a casing having a pressure chamber provided with an inlet and an outlet, an inlet valve having a single form of movement, elastically yieldable means tending to open the valve, pressure actuated means subject to outlet pressure and tending to close the valve, and other pressure actuated means subject to inlet pressure and supplementing the operation of the first mentioned pressure actuated means.

20. A pressure regulating valve comprising a casing having a chamber provided with an inlet and an outlet, an inlet valve having a single form of movement, elastically yieldable means tending to open the valve, pressure actuated means including a diaphragm subject to outlet pressure and tending to close the valve, and other pressure actuated means including a diaphragm subject to inlet pressure and supplementing the operation of the first mentioned pressure actuated means.

21. A pressure regulating valve comprising a casing having a pressure chamber provided with an inlet and an outlet, an inlet valve having a single form of movement, elastically yieldable means tending to move the inlet valve in one direction, pressure actuated means tending to move the valve in the opposite direction and subject to chamber pressure, and other means operated by inlet pressure and supplementing the operation of the first mentioned pressure actuated means.

CHARLES L. BASTIAN.